(12) United States Patent
Osborne (10) Patent No.: US 10,941,565 B1
(45) Date of Patent: Mar. 9, 2021

(54) AFFORDABLE ENERGY EFFICIENT AND DISASTER PROOF RESIDENTIAL STRUCTURES

(71) Applicant: Climate Shelter LLC, White Sulphur Springs, WV (US)

(72) Inventor: Don W Osborne, Crawley, WV (US)

( * ) Notice: Subject to any disclaimer, the term of this patent is extended or adjusted under 35 U.S.C. 154(b) by 0 days.

(21) Appl. No.: 17/000,391

(22) Filed: Aug. 24, 2020

Related U.S. Application Data (60) Provisional application No. 62/890,634, filed on Aug. 23, 2019.

(51) Int. Cl.
*E04B 1/80* (2006.01)
*E04B 1/16* (2006.01)

(52) U.S. Cl.
CPC .............. *E04B 1/803* (2013.01); *E04B 1/166* (2013.01)

(58) Field of Classification Search
CPC . E04B 1/78; E04B 1/7675; E04B 1/80; E04B 1/803
See application file for complete search history.

(56) References Cited

U.S. PATENT DOCUMENTS

| | | | | |
|---|---|---|---|---|
| 2,638,187 A * | 5/1953 | Tate | ......................... | E04B 1/803 52/792.1 |
| 3,464,168 A | 9/1969 | Russell et al. | | |
| 3,834,096 A * | 9/1974 | Becker | ..................... | F24F 5/00 52/172 |
| 3,929,186 A * | 12/1975 | Becker | .................. | F24F 5/0089 165/49 |
| 3,990,202 A * | 11/1976 | Becker | .................. | E04B 1/7092 52/172 |
| 4,023,317 A | 5/1977 | Bettger et al. | | |
| 4,420,922 A * | 12/1983 | Wilson | ...................... | E04B 1/90 52/788.1 |
| 4,468,902 A * | 9/1984 | Wilson | .................... | F24S 80/60 52/81.6 |
| 5,493,822 A * | 2/1996 | Tomb | ........................ | E04B 1/24 52/171.3 |
| 5,505,810 A * | 4/1996 | Kirby | .................... | B32B 27/322 156/286 |

(Continued)

FOREIGN PATENT DOCUMENTS

FR   2524039 A1   9/1983

*Primary Examiner* — Jessica L Laux
(74) *Attorney, Agent, or Firm* — Dinsmore & Shohl LLP; Monika L'Orsa Jaensson (57) ABSTRACT

The disclosed technology provides a module useful in constructing an energy efficient, durable building structure, the module including walls to form a vacuous, sealed chamber substantially void of structural elements, materials and gaseous molecules. One or more ribs are affixed to or formed integral with an exterior surface of the exterior wall of the module, extending the width of the module. The disclosed technology further provides a vacuum apparatus which may be incorporated in communication with the vacuous, sealed chamber, for creating and maintaining a vacuum within the module. A method of controlling heat transfer within a structure is also provided, utilizing the modules as herein disclosed, each module being coupled with a vacuum apparatus in communication with the vacuous, sealed chamber, for creating and maintaining a vacuum within the module.

8 Claims, 12 Drawing Sheets

(56) References Cited

U.S. PATENT DOCUMENTS

| | | | | |
|---|---|---|---|---|
| 5,527,411 A | * | 6/1996 | Jutte | B29D 99/001 156/204 |
| 5,664,396 A | * | 9/1997 | Lyman | F17C 3/08 52/788.1 |
| 7,178,302 B2 | * | 2/2007 | Chu | E04B 1/803 52/578 |
| 8,365,483 B2 | | 2/2013 | Hijazi | |
| 8,615,934 B1 | | 12/2013 | Webb et al. | |
| 8,765,247 B2 | | 7/2014 | Park | |
| 8,822,006 B2 | * | 9/2014 | Yoon | F16L 59/065 428/69 |
| 9,021,750 B1 | | 5/2015 | Matulin | |
| 9,140,053 B2 | * | 9/2015 | Luck | E06B 3/66304 |
| 9,371,641 B2 | * | 6/2016 | Christensen | E04B 1/32 |
| 9,481,994 B2 | | 11/2016 | Duforestel et al. | |
| 9,598,858 B2 | * | 3/2017 | Ogden | B32B 3/08 |
| 9,771,714 B2 | * | 9/2017 | Castelle | B32B 25/08 |
| 2009/0031621 A1 | | 2/2009 | Kitagawa | |
| 2009/0173037 A1 | | 7/2009 | Leo | |
| 2010/0279055 A1 | * | 11/2010 | Song | B32B 27/36 428/68 |
| 2011/0183119 A1 | * | 7/2011 | Rotter | E04D 3/28 428/172 |
| 2013/0029082 A1 | * | 1/2013 | Park | F16L 59/075 428/69 |
| 2014/0291448 A1 | * | 10/2014 | Luck | B64B 1/14 244/123.14 |
| 2019/0024360 A1 | * | 1/2019 | Haberman | E04B 1/3211 |

\* cited by examiner

AFFORDABLE ENERGY EFFICIENT AND DISASTER PROOF RESIDENTIAL STRUCTURES

BACKGROUND

The disclosed technology regards affordable, energy efficient, durable building structures and components thereof, including a plurality of modules, each module having a vacuous chamber substantially void of structural elements, materials and gaseous molecules. The disclosed technology further includes an apparatus for creating and maintaining a vacuum within the vacuous chamber of a structural module.

Planet Earth is experiencing dramatic environmental changes that are negatively affecting humanity. The polar ice caps are melting, causing the oceans to rise and increase in temperature. These changes are causing a dramatic increase in flooding, droughts, hurricanes, tornadoes, wildfires, etc. Much of the scientific community attributes this "Global Warming" to a dramatic increase in carbon dioxide in our atmosphere caused by the excessive burning of fossil fuels. A small percentage believe that this is just a natural cycle that will complete itself in due time.

In addition, as the world's population increases so does the world's need for residential structures. This increase raises the demand for energy consumption used in heating and cooling the same. This demand is compounded by natural disasters, such as hurricanes, tornados, and wildfires, which are destroying residential structures at an alarming rate. Energy used to deal with heating and cooling of residential and commercial structures, and for the construction of new structures and replacement of destroyed structures, represents a significant portion of the strain placed upon the environment and our economy.

Ultimately, if we are to survive as a human race we must come up with a plan of action that can practically deal with these problems. A step in the right direction is the continued search for more energy efficient and storm proof residential and commercial structures.

An understanding of heat transfer is foundational in the development of energy efficient and storm proof residential and commercial structures. Thermal energy is transferred by three primary means: conduction, convection and radiation.

Conduction is the transfer of thermal energy through an object by a series of collisions between adjacent atoms, molecules, or other forms of mass. For example, if the end of a steel rod is placed on a hot plate, the heat will be transferred through the rod until the temperature of the opposite end of the rod becomes the same as the first end on the hot plate. Specifically, the energy from the hot plate causes the molecules in the first end of the steel rod to move faster, which molecules transfer some of their extra kinetic energy to neighboring molecules and these, in turn, affect their neighbors. Therefore, the temperature of the entire steel rod increases. How rapidly an object transfers thermal energy by conductivity depends, in part, on the object's material.

Convection is the transfer of thermal energy due to the motion of the substance (gas or liquid) that contains the thermal energy. Natural convection results from the tendency of most fluids to expand when heated—i.e., to become less dense and to rise as a result of the increased buoyancy. Circulation caused by this effect accounts for the uniform heating of water in a kettle or air in a heated room: the heated molecules expand the space they move in through increased speed against one another, rise, and then cool and come closer together again, with increase in density and a resultant sinking.

In radiation (also known as electromagnetic radiation), thermal energy can be transferred from one location to another, even without a medium (e.g., air or water). The thermal energy can pass through a perfect vacuum, as energy from the sun does in reaching Earth. If a person stands near an open fire, the side of her facing the fire becomes much warmer than the other side. Most of the energy is transferred from the burning material to the person by means of electromagnetic radiation (a portion of heat energy is also transferred by means of thermal conduction and convection).

For heat energy to be transferred between two points, a temperature differential between those two points must exist. Unless forced otherwise, heat flows from regions of higher temperature to regions of lower temperature. To transfer thermal energy as heat from a cooler to a warmer region, work is required. It is important to note that heat energy moved by radiation can be mitigated by using materials to absorb or reflect the energy. For example, different colors, materials and structures can be used to affect the absorption or reflection of radiant energy.

Traditionally, heat transfer is mitigated in residential and commercial structures by insulation used in the structure's walls, ceilings and floors. An insulating material's resistance to conductive heat flow is measured or rated in terms of its thermal resistance or R-value—the higher the R-value, the greater the insulating effectiveness. The R-value depends on the type of material used in the insulation, its thickness, and its density and porosity. The R-value of some insulations also depends on temperature, aging, and moisture accumulation. Current materials offered for purposes of insulating a structure include insulation having vacuum cavities or 'dead' air space, such as impregnated foams, which achieve a high R-value as compared to standard insulation materials. However, these products will eventually lose their vacuum (and thereby their effectiveness), and tend to be too expensive to use as building materials for residential structures, finding more suitable applications in doors and refrigeration units.

In developing the disclosed technology, it was imperative to aggressively deal with all three methods of heat transfer, each of which present challenges to the fabrication of an economical, energy efficient residential or commercial structure. In particular, the energy efficiency of the disclosed technology maximizes the afore-described principle that heat cannot be transferred by conduction or convection through a vacuum, overcomes the challenges in creating and maintaining such a vacuum, and further mitigates heat transfer by radiation. Structures manufactured using the disclosed technology and the methods herein described are both economical and resist the forces of natural disasters such as hurricanes, tornados and wildfires.

GENERAL DESCRIPTION

The disclosed technology provides affordable, energy efficient, durable building structures and components thereof, and methods of constructing the same. As herein described, the present invention includes one or more modules, each module having a vacuous chamber substantially void of structural elements, materials and gaseous molecules which would otherwise transfer heat energy. This vacuous chamber is provided in the ceiling and at least a portion of the walls of a structure, thereby mitigating heat loss through conduction and convection.

Acknowledging that the vacuum in the chamber will present significant stress on the walls of the module, and that walls of the modules will likely be exposed to stress from external high atmospheric pressures and natural weather phenomenon, external bracing is provided to support the modules and the integrity of the chambers, while not interfering with the chamber's highly effective resistance to heat flow. Further, modules damaged beyond repair by storms, falling trees, etc., may be easily replaced in structures of the disclosed technology.

Creating and maintaining a vacuum on a small scale is fairly simple, as demonstrated in thermos bottles, and various commercially available insulation panels commonly used in freezers and residential entrance doors. Creating and maintaining a vacuum on a larger scale presents a significant challenge. The net volume of a vacuum chamber needed to effect proper insulation of an 1,800 ft² residential structure is estimated at or greater than 2,400 ft³. Further, over time there will be eventual loss or degradation of the vacuum in the vacuum chamber, and there is always a potential for leaks in the chambers. Commercially available vacuum pumps suitable to create and maintain the vacuum in the large vacuous chambers of the modules of the disclosed technology are expensive, and require significant energy to operate. Therefore, the disclosed technology further provides a novel apparatus for economically creating and maintaining a vacuum within the vacuous chambers of the structural module, requiring minimum energy to operate.

As stated above, no medium, such as air or water, is needed for the radiation (e.g., from the sun) to travel and transfer heat energy. To minimize the effect of thermal radiation, exterior elements of the disclosed technology may be coated with reflective material. Further, a roof structure made from material or covered in a coating designed to reflect radiant heat may be affixed to the modules of the disclosed technology. It is also believed that the distance between the walls of the vacuum chamber have some effect upon the amount of heat energy that is transferred via radiation; separating the internal wall of a module from the external wall by at least 12 inches may significantly reduce remnants of thermal radiation.

In certain embodiments, the module chamber is free from structural elements, but no vacuum is created in the chamber. Preliminary testing reveals that such modules provide a standard insulation R value of about 34.

The disclosed technology provides a module useful in constructing an energy efficient, durable building structure. The module includes an exterior wall, an interior wall and side walls, joined to form a vacuous, sealed chamber substantially void of structural elements, materials and gaseous molecules. One or more ribs are affixed to or formed integral with an exterior surface of the exterior wall of the module, extending the width of the module. A vacuum apparatus may be incorporated in communication with the vacuous, sealed chamber, for creating and maintaining a vacuum within the module.

In embodiments as hereinafter described, the module may be arc-shaped to increase the strength of the module and reinforce the exterior wall and the interior wall against the stresses created by an internal vacuum. In these and other embodiments, the module may be formed from a pair of module segments, each module segment being semi-arc shaped, and having an independent vacuous, sealed chamber.

The disclosed technology further provides an inexpensive, replaceable vacuum apparatus for creating and maintaining a vacuum within a vacuous, sealed chamber of a module useful in constructing an energy efficient, durable building structure, wherein the module includes an exterior wall, an interior wall and side walls, joined to form the vacuous, sealed chamber. The vacuum apparatus may include a pair of tubes in communication with the vacuous, sealed chamber. In some embodiments, as hereinafter described, each tube is in liquid communication with the other tube at one end, and with the vacuous, sealed chamber at the other end. As liquid is pumped into one tube, air is released to the environment from that tube, and air is drawn from the vacuous, sealed chamber in the other tube; as the flow of liquid among the tubes is reversed, the flow of air is reversed as well. Systems using this disclosed technology are intended to achieve an atmospheric pressure within the vacuous, sealed chamber, of between 8-25 inHg, or 10-15 inHg.

The disclosed technology further provides a method of controlling heat transfer within a structure, by providing at least one module as the ceiling and at least a portion of the walls of the structure, the module having an exterior wall, an interior wall and side walls, joined to form a vacuous, sealed chamber substantially void of structural elements One or more ribs are affixed to or formed integral with an exterior surface of the exterior wall. Each module is coupled with a vacuum apparatus in communication with the vacuous, sealed chamber, for creating and maintaining a vacuum within the module. The method further includes operating the vacuum apparatus to draw air out of the vacuous, sealed chamber, until the chamber has an atmospheric pressure of between 8-25 inHg, or 10-15 inHg. In embodiments of this technology, the method further includes monitoring the atmospheric pressure within the vacuous, sealed chamber, and further operating the vacuum apparatus when the atmospheric pressure is above a pre-defined level.

DETAILED DESCRIPTION

Embodiments of the disclosed technology provide affordable, energy efficient, durable building structures 200 and components thereof, and further methods of construction of structures including the building structures of the disclosed technology or components thereof.

Generally, the structures of the disclosed technology include one or more modules 1, an embodiment of which is shown in FIGS. 1A, 1B, 2-4, 5B, 6A, 6B, 8A, 8B, 9A, 9B, and 10A. Each module has at least one vacuous, sealed chamber 10 substantially void of structural elements, materials and gaseous molecules. The modules may be arc-shaped to increase the strength of the structure and reinforce the walls against the stresses created by the internal vacuum. When conjoined as hereinafter described, the modules form the building structure 200. The chamber 10 is herein described as a vacuous, sealed chamber, by which vacuum the chamber achieves a very high R value; however, in some embodiments the chamber are void of structural elements, but are not supplied with a vacuum, which preliminary testing shows can achieve a standard insulation R value. In larger chambers, structural elements may be provided to support the integrity thereof, as herein described. The disclosed technology is not intended to limit the embodiments of the chamber to one in which a vacuum has been applied or which is substantially void of structural elements, but rather is intended to also cover embodiments with chambers to which a vacuum has not been applied, or includes structural elements. Embodiments of the modules of the disclosed technology may have a length of between 8-14 ft., and a width of at least 12 ft., or between about 24-40 ft.

Figure 2:
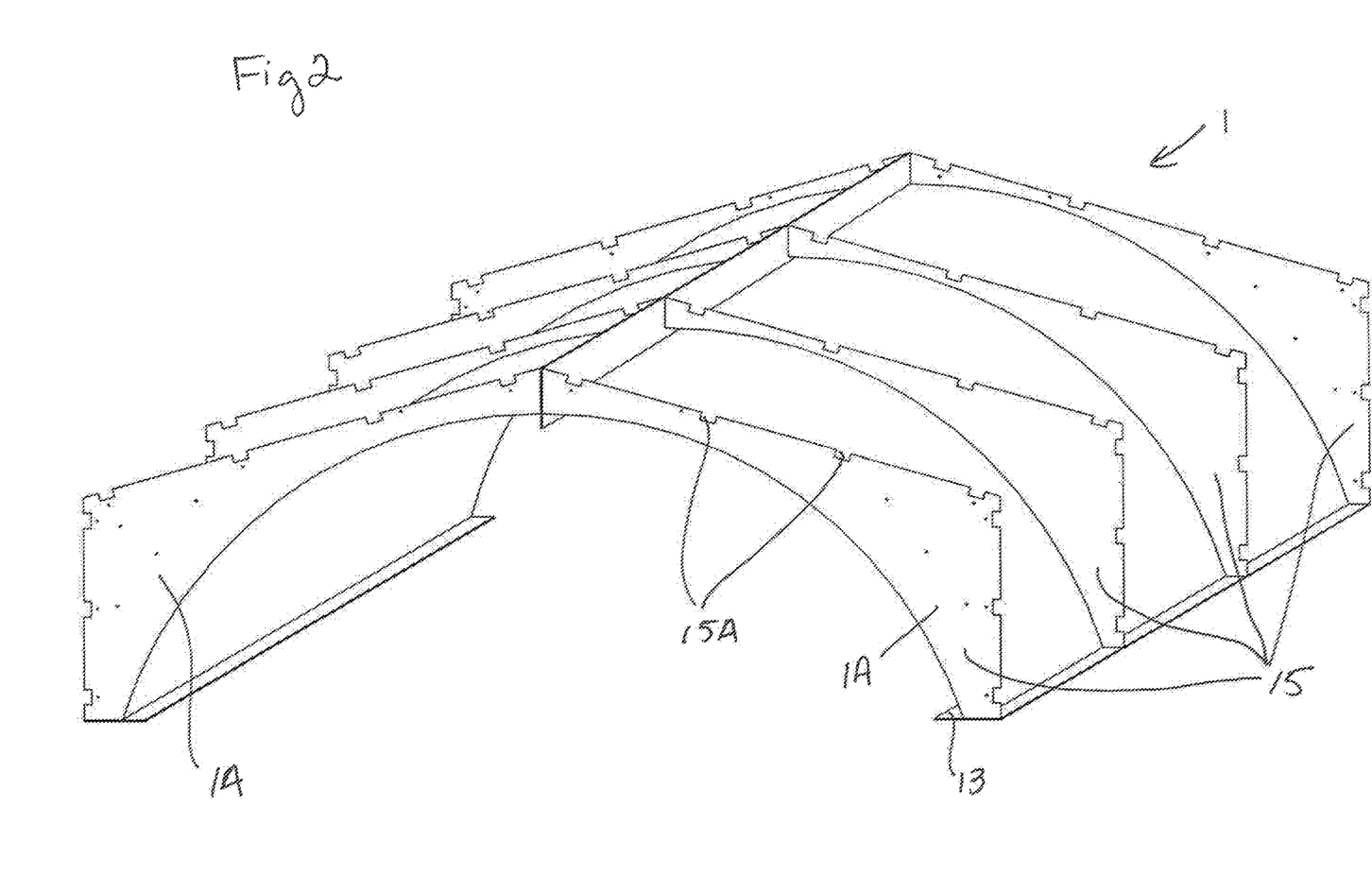
FIG. 2 is a peripheral view of an embodiment of module segments of the disclosed technology, conjoined to form a module.

As shown in FIG. 2, in some embodiments the modules may be semi-arc-shaped forming module segments 1A, so that when the segments are conjoined by bolting or other means as hereinafter described, they form the module 1, having two chambers 10.

Figure 3:
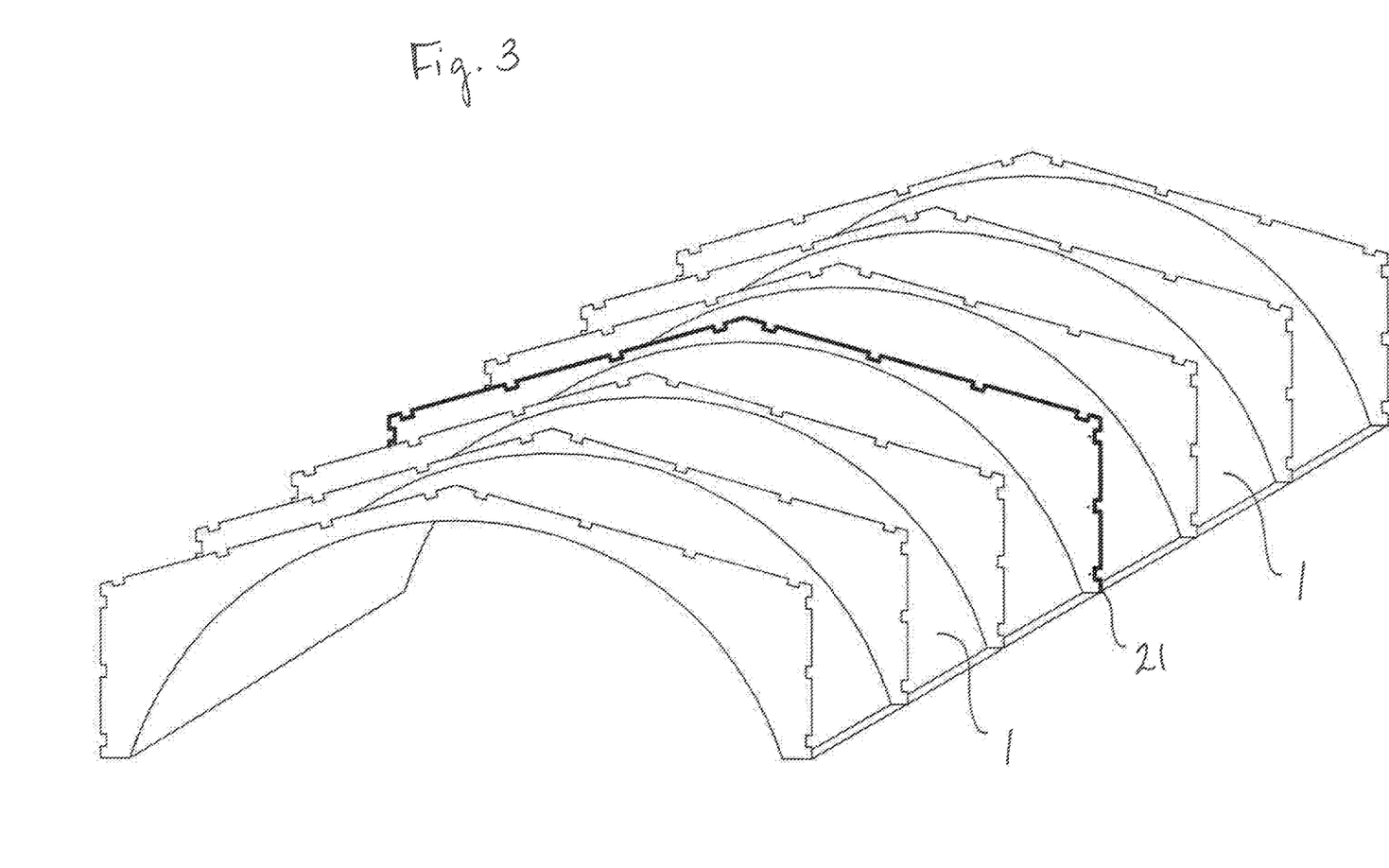
FIG. 3 is a peripheral view of an embodiment of conjoined modules of the disclosed technology.

Further, as shown in FIG. 3, a plurality of modules 1 or module segments may be conjoined by bolting or other means, to form structures of varying lengths. The design of these modules and module segments provide a method of construction which enables the construction of a large size structure, while keeping the transportation of the structure (by its components, to a provided site for assembly) practical.

Figure 1A:
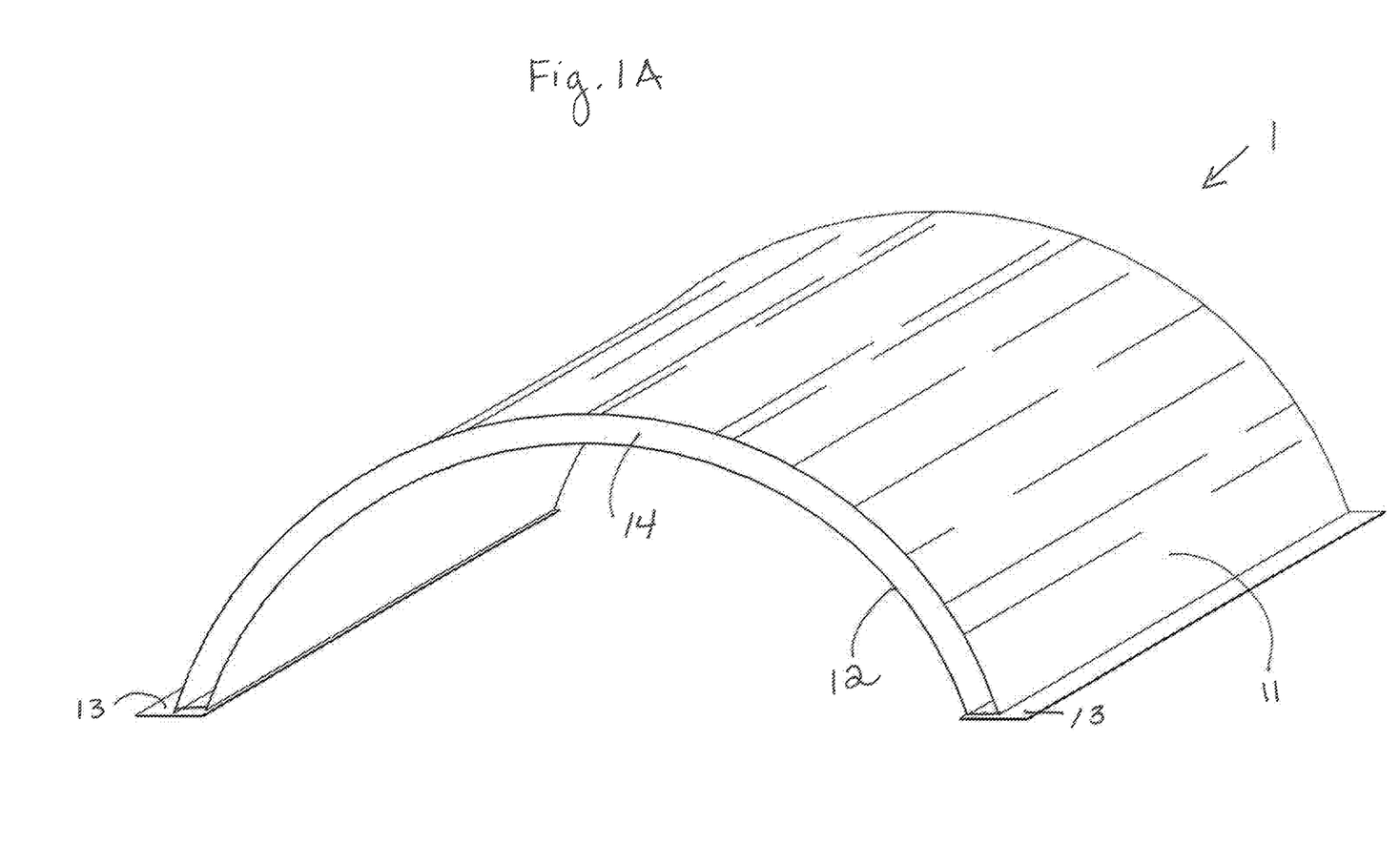
FIG. 1A is a peripheral view of an embodiment of the modules of the disclosed technology.

Each module (or module segment) has an exterior wall 11 and an interior wall 12. The exterior and interior walls are defined by an outer surface and an inner surface, wherein the inner surfaces of the walls form the chamber 10. In some embodiments, such as shown in FIGS. 1A, 1B, 2-4, 5B, 6A, 6B, 8A, 8B, 9A, 9B, and 10A, the exterior wall and the interior wall are formed in corresponding arc shapes, wherein the degree of curvature of each of the interior wall 11 and the exterior wall 12 are the same. One or more of the sides of the module or module segments are sealed with a correspondingly shaped side wall 14 traversing the width of the module as shown in FIG. 1A, which with the exterior and interior walls form the chamber 10. Further, each of the ends of the exterior wall and the interior wall of the module or the module segment may be affixed to a rectangular base 13, extending the length of each side of the module, thereby providing uniform depth along the width of the chamber. The depth of the chamber (the space between the exterior wall and the interior wall) plays a critical role in the net thermal resistance or R value of the module. In arc shaped and segmented embodiments, the depth of the chamber may be consistent along the width thereof, between, for example, 6"-24", or 12"-18", although for larger sized modules the depth of the vacuous chamber may be greater. In an embodiment, the depth of a module is 12", and the vacuum in the chamber (established as hereinafter described) has an atmospheric pressure of between 8-25 inHg, or 10-15 inHg; theoretically it is believed that in such an embodiment an R value of up to 300 can be achieved. Increasing the depth of the module chamber and/or the pressure therewithin increases the R value of the chamber.

Figures 1B, 1C:
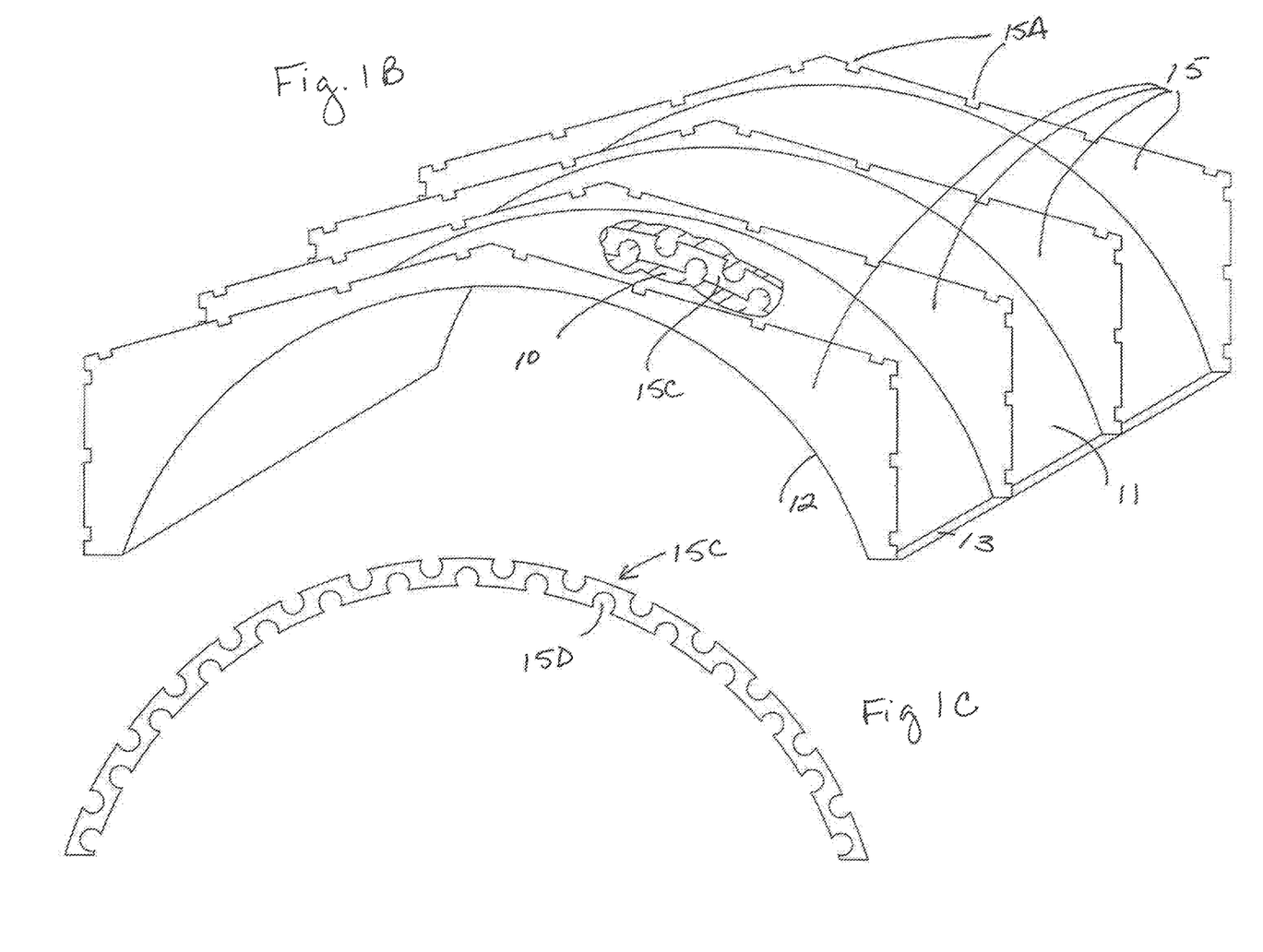
FIG. 1B is a peripheral view of another embodiment of the modules of the disclosed technology, with a side wall removed.
FIG. 1C is a side of an embodiment of internal bracing within a module of the disclosed technology.

In the exemplary embodiment shown in FIGS. 1A, 8A, 8B, 9A, 9B and 10A, no materials or structural elements are present within the chamber. To ensure physical integrity of the chambers when substantially void of gas molecules, one or more bracing elements, such as ribs 15, may be affixed to or formed integral with the exterior surface of the exterior wall of the module. At the sides of the module, the ribs 15 may be formed integral with, and extend from the side walls 14. As herein discussed, bracing the modules and their vacuous chambers on the exterior of the module, rather than within the chamber, eliminates thermal transferring materials within the chamber, and significantly increases the R-value of the modules. If internal bracing is required to maintain the structural integrity of the modules and the vacuum chamber (e.g., in larger modules, or where the modules are constructed from weaker materials), internal reinforcement ribs 15C may be provided within the vacuum chamber, as shown in FIG. 1B. The design of these internal reinforcement ribs may have cutouts 15D, as shown, to minimize heat transfer.

Each of the ribs 15 may extend the width of the arced exterior surface of the exterior wall. As shown for example in FIGS. 2, 3, 4, four ribs may be equidistantly position along the length of a module segment or module; more ribs may be necessary for larger modules. These ribs may have an architectural design, or may as shown in FIGS. 2, 3 and 4, may have a plurality of slots or cutouts 15A, which mitigate the transfer of heat by means of conduction, and/or facilitate attaching a roof (as shown in FIGS. 7A-7E, and hereinafter described), and further as hereinafter described may provide a means to bolt together modules to increase the length of the structure.

In some embodiments the outer surface of the exterior walls of the modules or module segments and the ribs may be coated with reflective materials to reflect solar rays and mitigate radiant heat transfer.

Structures constructed from modules or module segments as hereinabove described may include a plurality of modules, affixed one-to-another along their sides, as shown in FIG. 3, thereby providing flexibility in structural size. A low thermal conductive gasket material 21 may be placed between conjoined modules, to prevent air seepage and reduce the thermal conductive properties of the sides of the modules.

Figure 4:
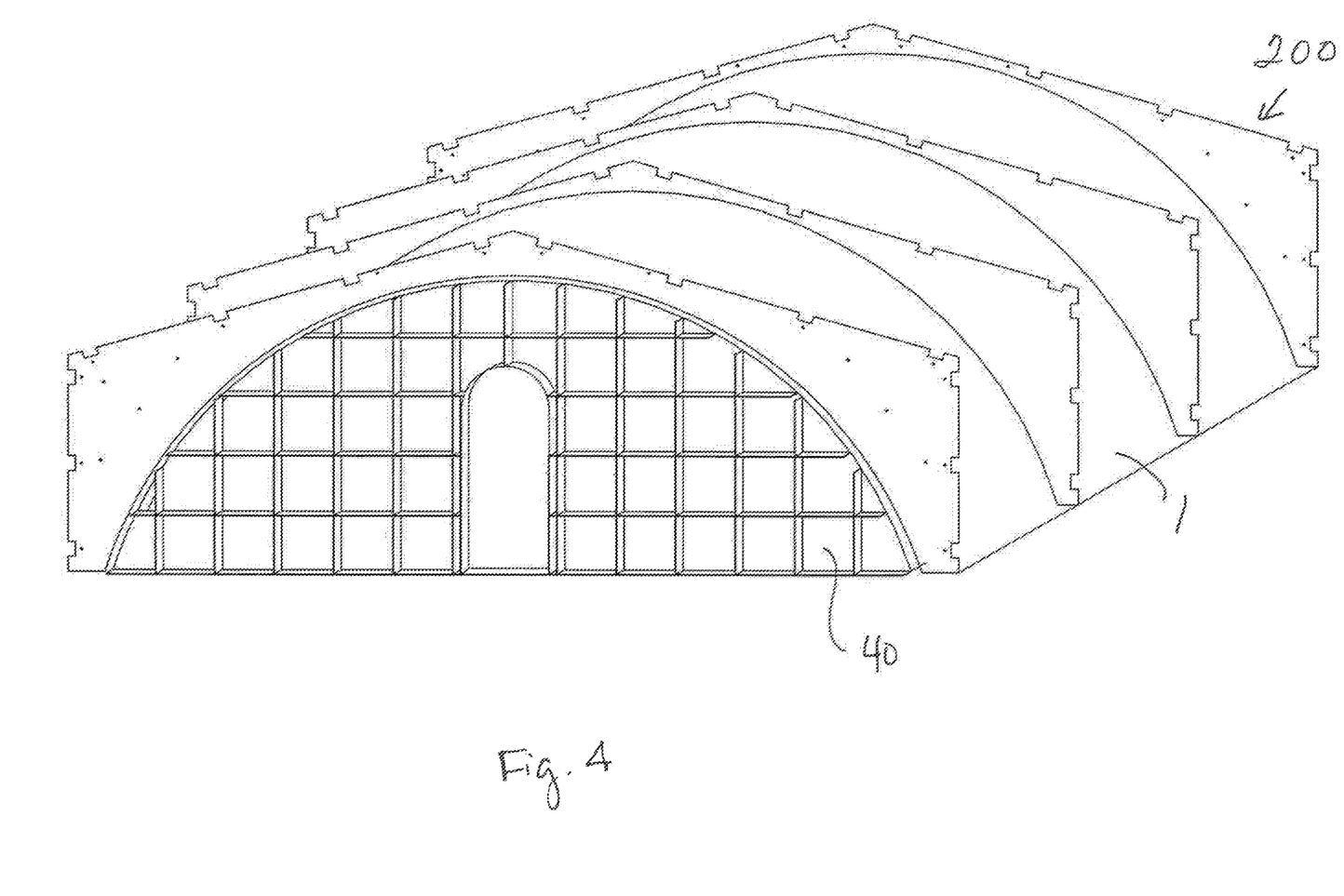
FIG. 4 is a peripheral view of an embodiment of a structure, having a module and an end wall of the disclosed technology.

As shown in FIG. 4, structures 200 of the disclosed technology may also include one or more end walls 40 affixed to a side of an end module 1 (or module formed from module segments). The end walls may have a uniform thickness, with a chamber between an exterior wall and an interior wall. In this embodiment, and to mitigate heat transfer, the end walls are reinforced by external bracing. Alternatively, standard insulation may be positioned within the interior and exterior walls of the end walls, allowing bracing between the interior and exterior walls to reinforce the structure. In either embodiment, foam insulation or low thermal conductive gasket material may be installed between the adjacent surfaces of the end walls and the corresponding module, to minimize thermal conduction between the components.

Figure 6A:
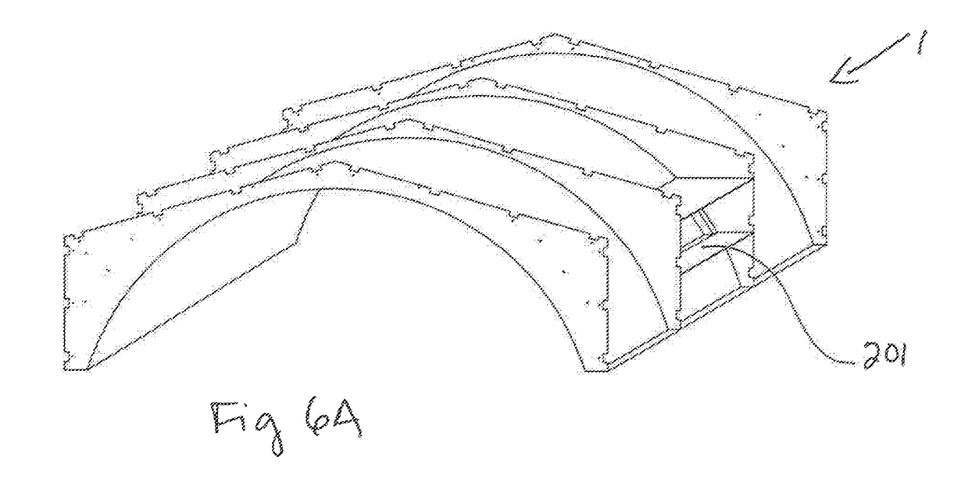
FIG. 6A is a peripheral view of an embodiment of a module of the disclosed technology, having a window.
Figure 6B:
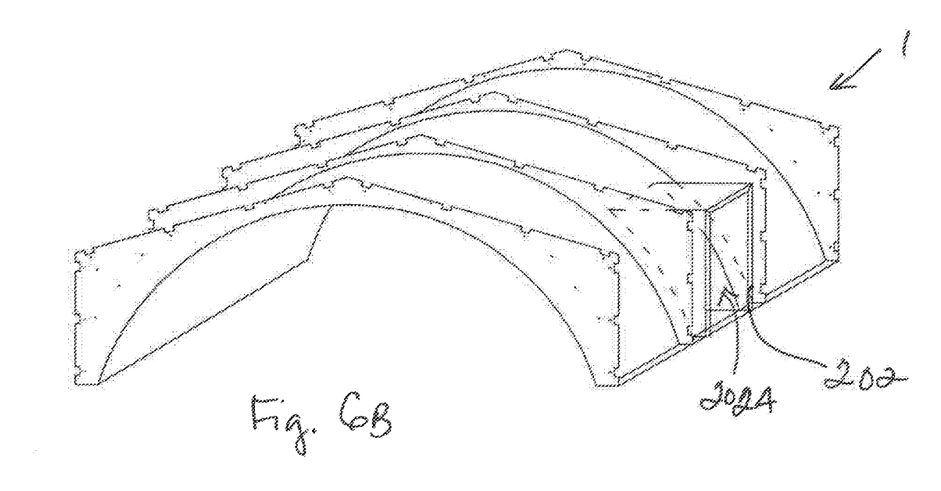
FIG. 6B is a peripheral view of an embodiment of a module of the disclosed technology, having a door and a foyer area.

As shown in FIGS. 6A and 6B, the modules (or conjoined module segments) can further accommodate windows 201, doors 202, and a foyer 202A, each of which may be fabricated between the external reinforcement ribs 15, and extending through the chamber 10, while maintaining the integrity of the sealed chamber.

In an embodiment, any or all of the modules, bracing elements, and side walls of the disclosed technology, and/or components thereof, are constructed from rolled or stepbroke steel, including carbon steel, which while a high thermal conductor is strong, fireproof, non-permeable, easy to fabricate, relativity inexpensive and able to maintain the vacuum within the vacuous chamber over a long period of time. Other durable materials may also be suitable for use in these elements of the disclosed technology. Robotic straight seam welding can be used to increase quality and dramatically reduce the cost of construction of modules or module segments, walls and bracing elements of the disclosed technology.

An exemplary structure includes a plurality of modules 1, each module having a width of less than 40 feet and a length of 8 to 14 feet, with an internal height of 8 feet; this height can be extended either by increasing the internal height of the module, or by walls installed below the module, as hereinafter described. These modules and other structural components of the disclosed technology may be fabricated at a remote fabrication facility and then transported to the construction site. Manufacturers of pre-fabricated structural components of the disclosed technology may want to be mindful of state regulations regarding load width/height/length.

At the construction site, the structures may be assembled by conjoining modules (or module segments) along their sides as shown in FIG. 3, by bolting their external ribs together, thereby retaining the structural integrity and functionality of the chambers 10. When using module segments, the same may be conjoined to form modules by bolting an endplate from a first module segment to the corresponding endplate of the second module segment, to form a module as shown in FIG. 2.

In an exemplary embodiment, three modules are conjoined as herein provided, each module having dimensions of 35⅓ ft.×17 ft., to in the aggregate make a structure of 1,800 ft$^2$. For an 1,800 ft$^2$ structure, it is estimated that over 2,400 ft$^3$ of vacuous space will be required to achieve desired insulation, although the climate of the intended use may be considered in determining the vacuous space required to achieve the requisite R value based upon the requirements of the local climate. The cubic foot volume of a vacuous chamber having a 12-inch depth would likely provide over 2,400 ft$^3$ over all modules.

Figure 10A:
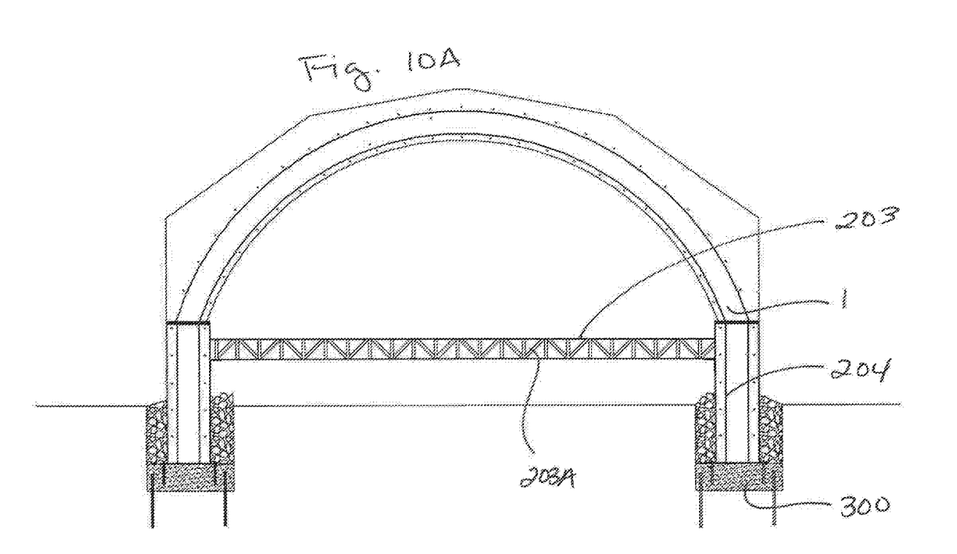
FIG. 10A is a side view of an embodiment of a module of the disclosed technology supported by floor support walls and having a trussed flooring, installed in trenches.
Figure 11:
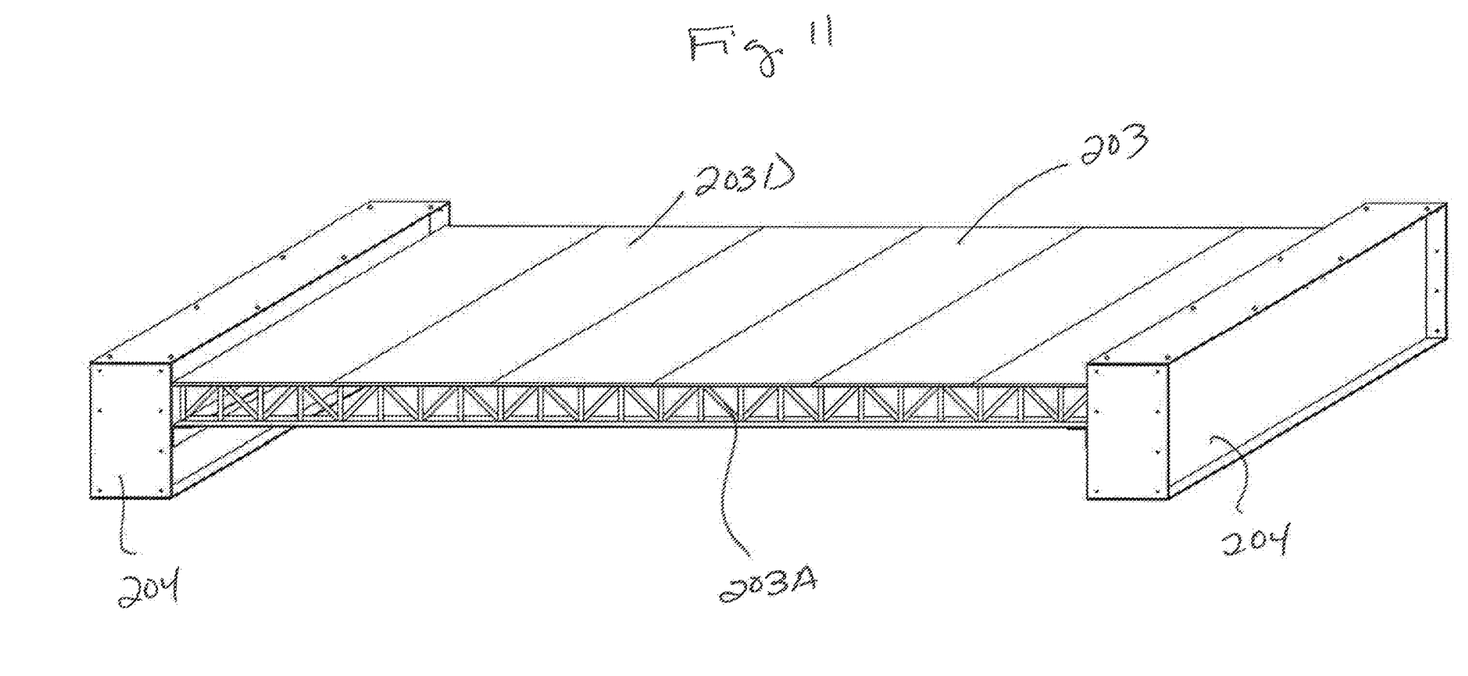
FIG. 11 is a peripheral view of an embodiment of modular flooring assembly of the disclosed technology.

Structures constructed from the disclosed technology may also include a floor 203. As shown in FIGS. 8A, 9B, 10A, and 11, the floor may include a plurality of trusses 203A, secured to floor support walls 204 to which the trusses are bolted or otherwise secured. As shown in FIG. 8C, the floor support walls may have angle iron 203C welded or otherwise secured therein to support and secure alignment of the trusses. Plywood or other suitable flooring material 203D may then be affixed to the tops of the trusses, as shown in FIG. 11. The trusses may be made from any suitable materials, including for example wood or steel. By this configuration, forces created by the vacuum in the modules 10, if any, which tend to pull the bases of the vacuum chamber together are mitigated. An insulating gasket may be positioned between the floor or the floor support walls, the base of the modules and/or any the end walls 40.

Further, the floor support walls 204 may be made at any reasonable height above or below ground. In some embodiments, as shown in FIG. 8D these walls 204 have a base 204A wider than the width of the wall 204. Cavities within the floor support walls may include standard insulation, or may be insulated by a vacuum within a vacuous cavity, using the herein-described technology. In an embodiment, as shown in FIGS. 10A and 10B, the base 204A sets upon and is bolted to a foundation 300. In some embodiments, such as the embodiment of FIGS. 8A, 9B, and 10A, the use of floor support walls to raise the floor of the structure yields a higher interior ceiling within the structure, and provides a crawl-space below the floor suitable for utilities, equipment and storage.

As shown in FIGS. 10A and 10B, in an embodiment the floor support walls may be installed in trenches. The depth of the trenches may be determined based upon the soil quality at the site; a trench of at least 3 feet is recommended. Reinforcing rods 302 may be driven into the base of each trench, and concrete is poured into the trenches. All thread rods 303 may be positioned and cast into the concrete, sized and configured to align with corresponding apertures of the base 204A. Finally, once the floor support walls are positioned, the trenches may be backfilled using tamped soil, concrete or other suitable materials.

Figure 9A:
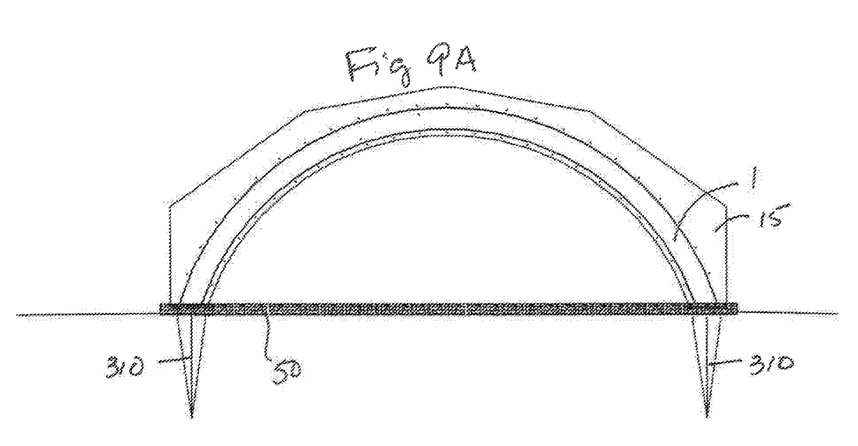
FIG. 9A is a side view of an embodiment of a module of the disclosed technology secured to the ground by means of earth spikes.
Figure 9B:
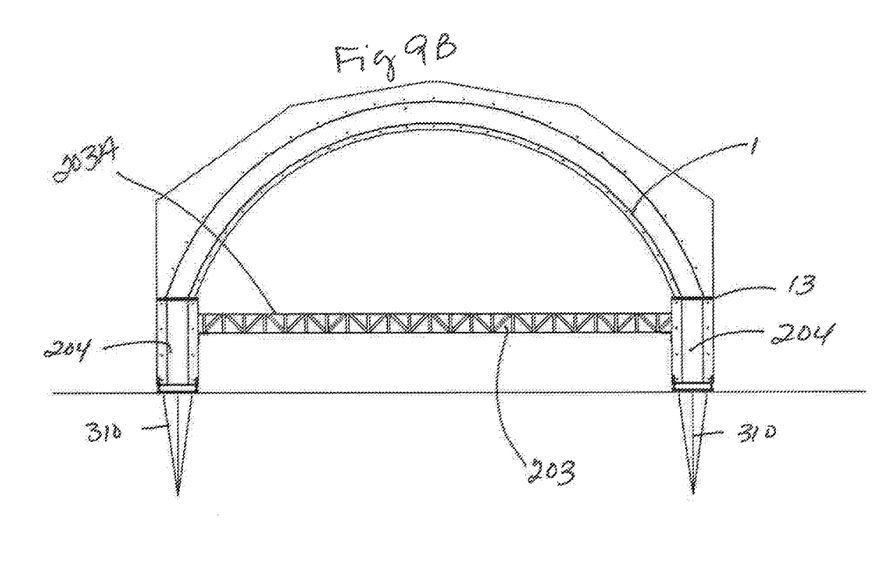
FIG. 9B is a side view of an embodiment of a module of the disclosed technology supported by end support walls and having a trussed flooring, secured to the ground by means of earth spikes.
Figure 9C:
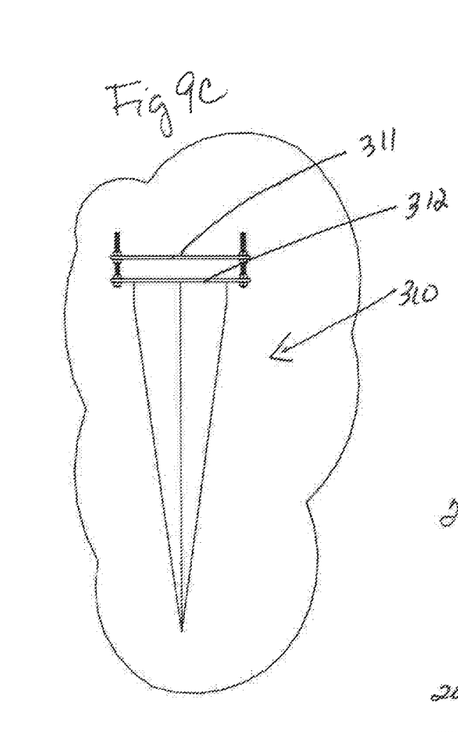
FIG. 9C is a side view of an embodiment of earth spikes suitable for use in securing the modules of the disclosed technology to the ground.
Figure 10B:
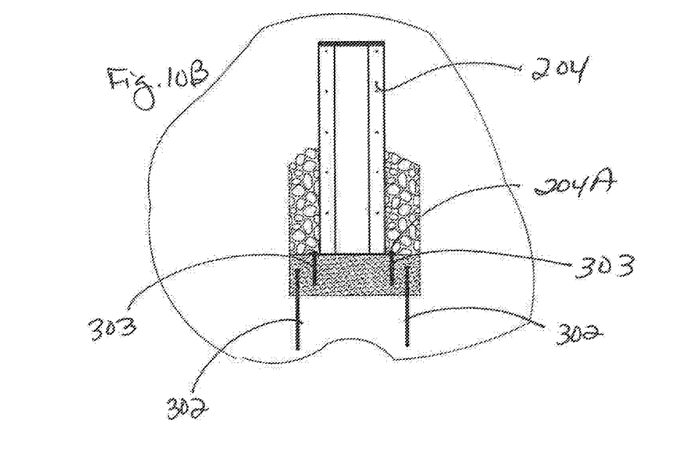
FIG. 10B is a partial view of the floor support walls of FIG. 10A as installed in the trenches.

In an alternative configuration, as shown in FIGS. 9A and 9B, a large earth spike 310 may be coupled with the modules or base of the floor support walls to secure the structure to the ground. In this configuration, the structure of the disclosed technology may be constructed in remote locations (inaccessible to drench digging equipment, for example), and/or easily moved from one site to another. The spike may be made from galvanized steel, for example, or other suitable material. To install the spikes, a hole is augured into the ground, and the spike may then be hydraulically pushed into the ground. As shown in FIG. 9C, the spike 310 has a top plate 311, the position of which may be adjusted (by adjusting the position of one or more corners of the top plate 311 relative to the bottom plate 312), to ensure the structure is supported horizontal with the horizon. In this embodiment, corners of the module(s) or module segments are then secured to the top plate 311 of the spike, by welding or otherwise.

These floor and base embodiments may be partially or wholly pre-fabricated, an example of which is shown in FIG. 11. In this embodiment, a pre-fabricated base inclusive of any of the floor 203, floor support walls 204, trusses 203A, and/or flooring material 203D may be supplied with each module (or set of module segments), conjoined with the module at the construction site. In some further embodiments, accommodations are made on the bottom side of the floor and base to support utility wiring and other piping or structure, thereby further decreasing the cost and time of assembly at the construction site.

Figure 8A:
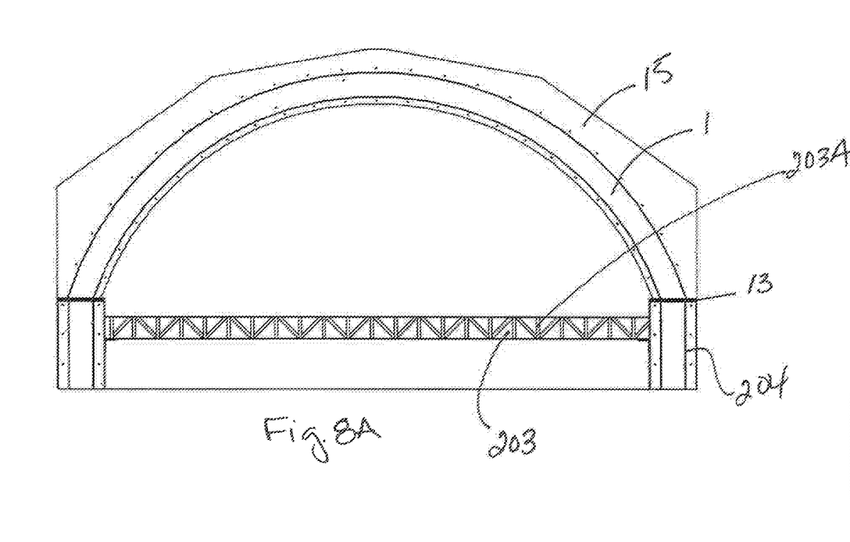
FIG. 8A is aside view of an embodiment of the module of the disclosed technology installed with raised flooring.
Figure 8B:
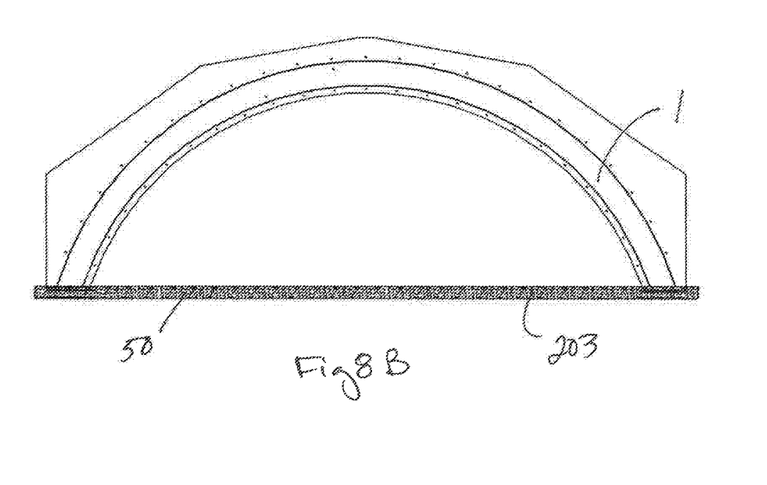
FIG. 8B is a side view of an embodiment of the module of the disclosed technology installed on a flat surface.
Figures 8C, 8D:
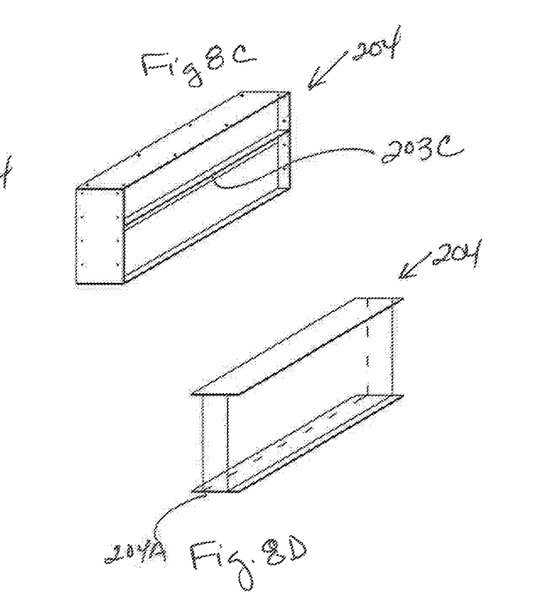
FIG. 8C is a peripheral view of an embodiment of floor support walls of the disclosed technology.
FIG. 8D is another view of the embodiment of floor support walls shown in FIG. 8C.

In yet another embodiment, as shown in FIGS. 8B and 9A, the floor 203 may be a concrete pad 50 upon which the assembled structure is positioned; as hereinabove described, floor support walls may provide additional height to the structure, with or without raised flooring.

In yet another embodiment, the modules may be affixed to a foundation which is anchored to the earth, such as a plurality of prefabricated wide and hollow steel walls of any height. The foundation may be a foot wider than the dimensions of the modules or the structure including a plurality of modules. The cavities of the walls forming the foundation can be filled with soil or other types of heavy insulation. Concrete walls may be bolted to the foundation anchored to the earth to provide a platform to which the structure of the disclosed technology may anchor. In this and other embodiments, the foundation may provide a vacuous space sufficient to accommodate a basement.

Figures 5A, 5B:
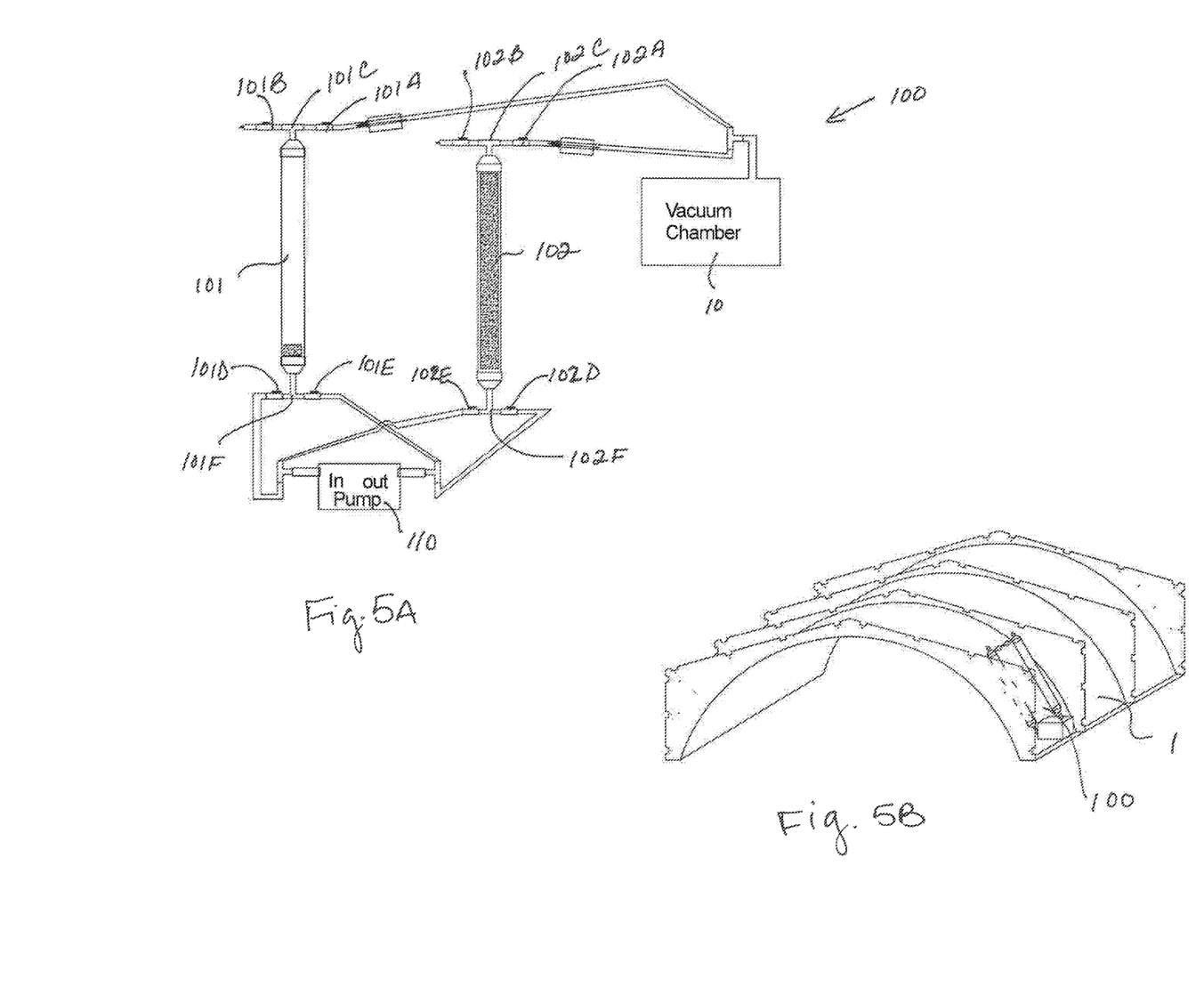
FIG. 5A is a schematic view of an embodiment of a vacuum apparatus of the disclosed technology.
FIG. 5B is a peripheral view of the vacuum apparatus of FIG. 5A installed on an embodiment of the module of the disclosed technology.

As shown in FIG. 5A, embodiments of the disclosed technology may further include a vacuum apparatus 100 for creating and maintaining a vacuum within a module 1 or a module segment 1A. The apparatus may be positioned between two of the external ribs of each module (see, e.g., FIG. 5B). By having a vacuum apparatus for each module, no plumbing between modules would be required. In other embodiments, the modules may be connected with plumbing, connecting one or more vacuum chambers so a single vacuum pump could be used to create and maintain the vacuum levels in some or all of the modules of a structure. This plumbing may be designed so that each module may still remain separate from the others, which would permit control of the R values of each module independently of the others.

In one embodiment, as shown in FIG. 5A, an inexpensive, replaceable, vacuum apparatus 100 includes two tubes 101, 102. The tubes may have an inner diameter of 6-12", wherein the diameter of the tubes control the rate at which the vacuum is created. Further, the tubes may be 5-8 ft. long, and in some embodiments (not shown) may have a curvature corresponding with the curvature of the exterior walls of the corresponding module. The tubes may be made from schedule 80 polyvinyl chloride (PVC) or steel, or other suitable materials.

As shown in FIG. 5B, the top of each tube of the vacuum apparatus has a top inlet 101A, 102A, each in sealed communication with the chamber 10, and a top outlet 102A, 102B, which emits air to the environment. Each of the inlet/outlet pairs are controlled by a shutoff valve 101C, 102C, which valve directs whether air is drawn by the respective tube from the vacuum chamber or emitted to the environment. The valves may be electrically operated, and are normally closed until energized. As shown in FIG. 5B, the tubes are mounted in a vertical or angular position to the module, such as for example the exterior surface, between two ribs.

Likewise, the base of each tube has a base outlet 101D, 102D, and a base inlet, 101E, 102E, each pair of which are also controlled by a shutoff valve 101F, 102F, the valves being normally closed until energized. A first outlet of each tube 101D, 102D is connected to the corresponding inlet 102E, 101E of the other tube, in each case through a liquid transfer pump 110. One way check valves may be positioned throughout the system to prevent any vacuum from escaping from the vacuum chamber, or liquid to pass in an unintended direction. The shutoff valves control the flow of liquid within the system, and permit air to escape from the tubes being filled and draw the vacuum from the chamber at the end of each stroke.

The liquid transfer pump 110 of the vacuum apparatus may be a single phase 120 v system, having a flow rate of at least 4,000 gallons per hour (gph), requiring less than 8 amps of power. With this low energy requirement, the pump can be powered by wind or solar power.

As shown in FIG. 5A, in operation, the first tube 101 is filled with the intended liquid (e.g., brake fluid, or other or other high-boiling point liquid), and the second tube 102 is partially filled with the same liquid. The inlet valve 101A of the first tube is set to draw air from the vacuum chamber, and the outlet valve of the second tube is set to deliver air to the environment. The liquid is drawn from the first tube through the base outlet 101D by means of the liquid transfer pump, and delivered to the second tube at its base inlet 102E, which creates a vacuum at the top of the first tube, and by this configuration pulls gasses (air) from the vacuum chamber 10 of the module into the first tube, and expels air into the environment from the second tube. When the second tube is full of liquid, the electrically operated valves reverse, so that the inlet of the second tube is set to draw air from the vacuum chamber, and the inlet of the first tube is set to deliver air to the environment. The liquid is drawn from the base outlet 102D of the second tube by means of the liquid transfer pump, and delivered to the first tube at its inlet 102E, which creates a vacuum at the top of the second tube, and by this configuration pulls gasses (air) from the vacuum chamber 10 of the module into the second tube, and expels air into the environment from the first tube, until the first tube is full of liquid. The cycle is automatically repeated until the proper vacuum has been achieved within the vacuum chamber of the module.

As shown in FIG. 5D, when the apparatus has achieved the desired vacuum within the chamber of the modules, the shutoff valves 101C, 102C, 101F and 102F, are all de-energized, preventing any vacuum from escaping the module.

The vacuum apparatus may include an electrical controller or logic computer program to control the cycles and overall operation of the vacuum apparatus. The vacuum apparatus may also include a pressure sensor within the module which can communicate a pressure level within the module to the electrical controller to stop operation of the system and de-energize the shutoff valves when the pressure within the vacuum chamber is above a predetermined vacuum level; and to start operation of the system and energize the shutoff valves when the vacuum falls below a predetermined value. By this configuration, the controller can detect any air leaks within a module by a rapid change in pressure therewithin.

In other embodiments, the vacuum apparatus may be a hydraulic plunger system coupled with a hydraulic pump or cable winch.

In larger structures a low pressure high volume impeller fan (e.g., fans used in cyclone dust collection systems) can be used to initially rapidly remove a large portion of the air from the vacuum chamber when coupled with the chamber; thereafter a vacuum apparatus as hereinabove described may be positioned on the vacuum chamber to complete the evacuation process, and maintain the vacuum within the chamber. Commercially available vacuum pumps, although expensive, can be used with one or more modules of the disclosed technology.

Figure 7A:
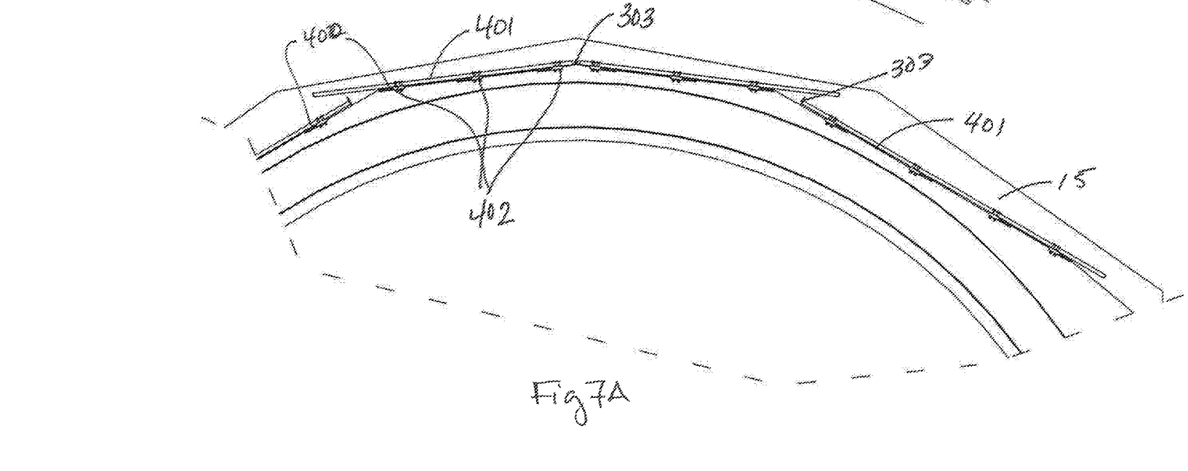
FIG. 7A is a peripheral view of an embodiment of a replaceable roofing system useful with the modules of the disclosed technology.
Figures 7B, 7C, 7D, 7E:
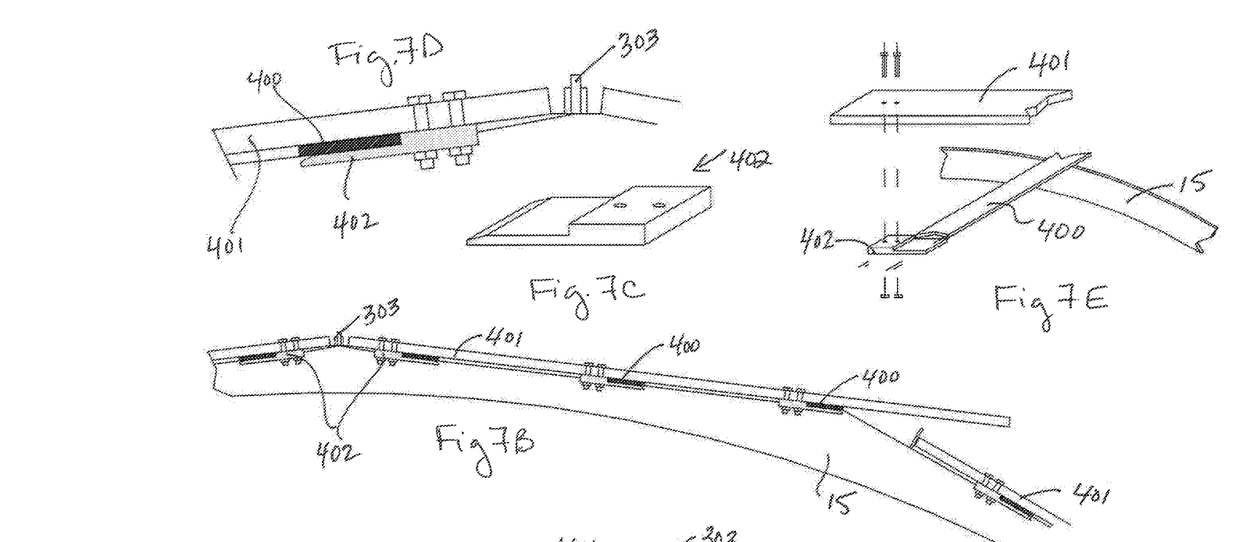
FIG. 7B is a closer view of portions of the roofing system of FIG. 7A.
FIG. 7C is a view of an embodiment of an embodiment of a machined bracket of the roofing system of the disclosed technology.
FIG. 7D is a side view of the ends of an embodiment of the roofing slats of the roofing system of the disclosed technology.
FIG. 7E is an exploded view of the installment of a roofing slat on a bar of a roofing system of the disclosed technology.

Acknowledging that holes could appear in a wall of the modules, it is important that this this hole can be easily accessed for repair. While a hole would be fully accessible when a roof is not provided, as shown in FIGS. 7A, 7B, 7C, 7D and 7E, a series of roofing slats may be positioned among the ribs of the module. In this embodiment, and as shown in FIGS. 7A, 7B and 7E, a series of flat bars 400 to support the roofing slats may be welded to the top of the ribs 15. Each flat bar supports a plurality of roofing slats 401, which collectively form the roof. The slats may comprise a material resistant to radiant heat from the sun. These slats can be attached to the flat bars 400 using bolts, although over time bolts can become corroded and become difficult to remove. Further, it may be difficult to align the bolts with the holes in the flat bar after the slats 401 are removed to conduct a repair. To mitigate this problem, machined brackets 402 may be bolted to the roof forming slats 401, distanced so that they may receive (in the machined part thereof) and hang on the flat bars 400, removably supporting the roof slats. A removable stop bar 303 may be positioned between the ribs, to contain upward movement of the roofing slats; once this stop bar is removed, the slat bars may likewise be removed to expose a hole or area needing repair, and then repositioned on the flat bars. Using this method, any point on the outer surface of the module (where, for example, a leek has developed) can be accessed by removing the proximate one or more slats, without removing a large section of the roof. Further, by this design individual roofing slats which have deteriorated over time can be easily removed and replaced.

Tests conducted on current technologies as compared to an rectangular-shaped module having a length of 36", a width of 24", and a depth of 12", void of structural elements within the vacuous chamber of the module. The material/structure tested was positioned between a hot room and a test room. The hot room was heated to a temperature of 84° F., and the test room was cooled to a temperature of 60° F. In the test the amount of time it took for the rooms to achieve the same temperature was measured, which revealed the following:

| Material/structure | Time | R Value |
|---|---|---|
| 6" polystyrene insulation | 6 hrs. | 30 |
| Module, no vacuum applied | 7 hrs. | 34 |
| Module, 5 in Hg vacuum applied | 9.5 hrs. | 46 |
| Module, 10 in Hg vacuum applied | 14 hrs. | 71 |
| Module, 15 in Hg vacuum applied | 15.5 hrs. | 78 |
| Module, 20 in Hg vacuum applied | 20 hrs. | 100 |

The invention claimed is:

1. A method of controlling heat transfer within a structure, the method comprising:
   a. providing at least one module as the ceiling and at least a portion of the walls of the structure, the module having an exterior wall, an interior wall and side walls, joined to form a vacuous, sealed chamber substantially void of structural elements, the module further having one or more ribs affixed to or formed integral with an exterior surface of the exterior wall, each module coupled with a vacuum apparatus in communication with the vacuous, sealed chamber, for creating and maintaining a vacuum within the module; and
   b. operating the vacuum apparatus to draw air out of the vacuous, sealed chamber, until the chamber has an atmospheric pressure of between 10-25 inHg.

2. The method of claim 1, wherein the method further comprises monitoring the atmospheric pressure within the vacuous, sealed chamber, and further operating the vacuum apparatus when the atmospheric pressure is above a predefined level.

3. The method of claim 2, wherein the structure comprises a plurality of modules, and further a pair of end walls affixed to the sides of the structure.

4. The method of claim 3, wherein the structure is supported on floor support walls, which floor support walls further support a plurality of trusses to which a flooring may be secured.

5. The method of claim 1, wherein the module is arc-shaped to increase the strength of the module and reinforce the exterior wall and the interior wall against the stresses created by an internal vacuum, and wherein the degree of curvature of the interior wall is the same as the degree of curvature of the exterior wall.

6. The method of claim 1, wherein the module comprises a pair of module segments, each module segment being semi-arc shaped, and having a vacuous, sealed chamber so that when conjoined to form the module, the module also has a second vacuous, sealed chamber.

7. The method of claim 1, wherein each of the ends of the exterior wall and the interior wall are affixed to a rectangular base.

8. The method of claim 1, wherein the module has a length of between 8-14 ft., a width of between about 12-40 ft., and a depth of at least 12 inches.

* * * * *